United States Patent

Schubert et al.

[11] 3,865,834
[45] Feb. 11, 1975

[54] 2'-[HYDROXYALKOXY]-6,7-BENZOMORPHANS

[75] Inventors: Hans-Werner Schubert; Otto Behner; Friedrich Hoffmeister, all of Wuppertal-Elberfeld, Germany

[73] Assignee: Bayer Aktiengesellschaft, Leverkusen, Germany

[22] Filed: Jan. 5, 1973

[21] Appl. No.: 321,278

Related U.S. Application Data

[63] Continuation-in-part of Ser. No. 37,332, May 14, 1970, abandoned.

[30] Foreign Application Priority Data
May 17, 1969  Germany............................ 1925297

[52] U.S. Cl............................ 260/293.54, 424/267
[51] Int. Cl............................................. C07d 39/00
[58] Field of Search................. 260/293.54, DIG. 13

[56] References Cited
UNITED STATES PATENTS

| | | | |
|---|---|---|---|
| 3,322,778 | 5/1967 | Kupchan et al.................. | 260/294.7 |
| 3,474,106 | 10/1969 | Ziering............................. | 260/294.7 |
| 3,632,591 | 1/1972 | Albertson ....................... | 260/293.54 |

*Primary Examiner*—G. Thomas Todd

[57] ABSTRACT

Benzomorphans of the formula:

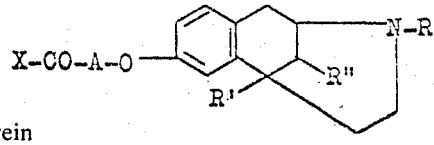

wherein
R is cyclopropylmethyl or cyclobutylmethyl;
R' and R'' are the same or different, and are straight or branched chain hydrocarbons of 1 to 5 carbon atoms;
X is OH, OR''' or

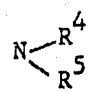

wherein
R''' is a straight or branched chain, saturated or unsaturated hydrocarbon of 1 to 11 carbon atoms;
$R^4$ and $R^5$ are the same or different, and are hydrogen, straight or branched chain, saturated hydrocarbon of 1 to 4 carbon atoms, or $R^4$ and $R^5$ together with the nitrogen atom form a 5- or 6-membered heterocyclic ring which may have oxygen as a second heteroatom; and
A is a bivalent, straight or branched chain, saturated or unsaturated hydrocarbon of 1 to 10 carbon atoms or said hydrocarbon substituted by 1 or more phenyl moieties, or 1 or more phenyl moieties substituted by alkyl, alkoxy, halogen, nitro or acylamino, and pharmaceutically acceptable non-toxic salts thereof are useful as analgesics.

5 Claims, No Drawings

2'-[HYDROXYALKOXY]-6,7-BENZOMORPHANS

This is a continuation-in-part of our copending application Ser. No. 37,332 filed May 14, 1970 and now abandoned.

The present invention is concerned with benzomorphans and their production. These compounds are useful as analgesics.

It is known that the so-called strongly active or "narcotic analgesics" exhibit similar pharmacological effects to that of morphine independent of their chemical composition. As a result, such compounds cause similar concomitant effects and side-effects as morphine itself and at a high dosage level produce similar toxic phenomena as does morphine. Thus, the morphine-like effect of such compounds which produces morphine-like physiological and psychic dependence in humans and animals, commonly known as morphine addiction, is of great significance.

As a result of these effects, analgesics like morphine and those which exhibit morphine-like effects are only used under closely supervised circumstances in order to minimize the possibility of morphine addiction. Because of the likelihood of morphine addiction, such compounds cannot be used for long term pain relief. Thus, any new analgesic which exhibits a high activity level and at the same time either does not produce a morphine-like addiction or dependence, or produces an addiction or dependence which is less pronounced than morphine and the morphine-like analgesics represents a significant and important advance in the art.

Clinical-therapeutic experience has demonstrated that the analgesic effect of known strongly active analgesics is not always sufficient for the treatment of conditions which produce severe pain, such as the pain associated with carcinoma. In such cases, the analgesic effectiveness will outweigh the addictive side-effects so that analgesics which are stronger than morphine and morphine-like analgesics would be of considerable and important usage even though such compounds might cause addiction.

It is well known in the art that both the analgesic effects and the side-effects or concomitant effects of analgesics can be accurately determined in animal experiments. The analgesic effects are particularly reliably detected in the heat ray test on the tail of a rat, according to d'Amour and Smith.

The concomitant effects and especially the addiction causing properties of analgesics can be determined by testing such compounds on morphine-dependent monkeys, i.e., monkeys addicted to morphine.

Compounds which are tested on morphine-dependent monkeys and which are not capable of replacing morphine or exerting a morphine antagonist effect in such monkeys are considered to be free of morphine addiction and dependent type properties.

The benzomorphans of the present invention exhibit a high level of analgesic activity and are superior to such known strong analgesics as morphine, codeine and pethidine. The benzomorphans of the present invention are superior to these known analgesics either by virtue of a stronger analgesic activity, lower toxicity, i.e., better toleration, or both. In addition, many of the compounds of the present invention have been shown to be free of properties which cause addiction based on recognized animals experiments, or exhibit such properties only to a slight extent. Some of the compounds of the present invention also have shown usefulness in the treatment of manic-depressive illness in humans.

The benzomorphans of the present invention are represented by the formula:

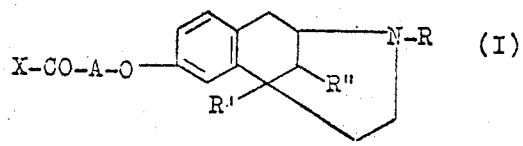 (I)

wherein
R is cyclopropylmethyl or cyclobutylmethyl;
R' and R'' are the same or different, and are a straight or branched chain saturated hydrocarbon of 1 to 5 carbon atoms, especially alkyl of 1 to 5 carbon atoms;
X is OH, OR''' or

wherein
R''' is a straight or branched chain, saturated or unsaturated hydrocarbon of 1 to 11 carbon atoms, especially straight or branched chain alkyl of 1 to 11 carbon atoms or straight or branched chain alkenyl of 2 to 11 carbon atoms;
$R^4$ and $R^5$ are the same or different, and are hydrogen, or a straight or branched chain saturated hydrocarbon of 1 to 4 carbon atoms, especially alkyl of 1 to 4 carbon atoms, or $R^4$ and $R^5$ together with the nitrogen atom form a 5- or 6-membered heterocyclic ring wherein the nitrogen atom is the only heteroatom or wherein oxygen is present as a second heteroatom, such as pyrrolidine, piperidine or morpholine; and
A is a bivalent, straight or branched chain, saturated or unsaturated hydrocarbon of 1 to 10 carbon atoms or a bivalent straight or branched chain, saturated or unsaturated hydrocarbon of 1 to 10 carbon atoms substituted by a member selected from the group consisting of 1 phenyl group, more than 1 phenyl group, and 1 or more phenyls substituted by alkyl, alkoxy, halogen, nitro or acylamino. In particular, it is preferred that A is alkyl of 1 to 10 carbon atoms, alkylene or alkylidene of 1 to 10 carbon atoms, alkenyl or alkenylene of 2 to 10 carbon atoms, or said alkyl, alkylene, alkylidene, alkenyl or alkenylene substituted by unsubstituted or substituted phenyl.

These benzomorphans may be produced by a number of processes. Thus, compounds of the formula I are produced by first demethylating in a manner per se known a benzomorphan of the formula:

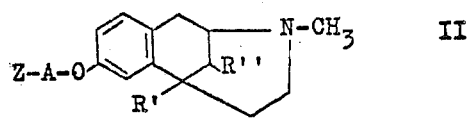 II wherein R', R'' and A are as above defined, and Z is CO—X or CN, wherein X is as above defined.

The demethylation can for example be effected by reaction with cyanogen bromide and acid hydrolysis of the resulting cyanamide, by reaction with chloroformic acid esters and alkaline hydrolysis of the urethane first formed or by reaction of azodicarboxylic acid esters and acid hydrolysis of the resulting addition compound. During the hydrolysis, nitrile, ester and amide groups which are present are also saponified. The resulting nor-compounds of the formula III:

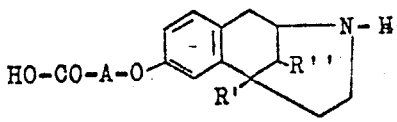   III wherein R', R'' and A are as above defined, can then be reacted according to methods per se known, for example, with acyl halides of the formula IV:

<p align="center">R⁶—CO—HAL</p>

<p align="right">IV</p> wherein
R⁶ is cyclopropyl or cyclobutyl and Hal is halogen, to give compounds of the formula V:

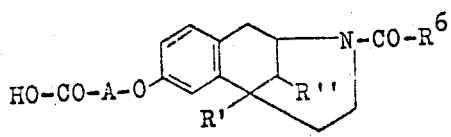   V wherein R', R'', A and R⁶ are as above defined, and these can be reduced with suitable reducing agents, in a manner per se known, to give compounds of the formula VI:

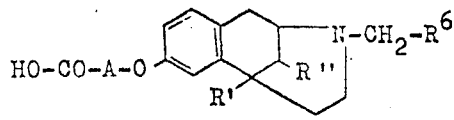   VI wherein R', R'', R⁶ and A are as above defined.

As the reducing agent one can use diborane, in which case it is necessary first to convert the carboxyl group into the acid halide group.

These compounds are also obtained if compound III is esterified, the reaction product is acylated with compounds of formula IV, the ester group is subsequently saponified and the amide group is reduced as described above.

The conversion of VI into the compounds according to the invention, of formula I, in which X denotes OR''' and

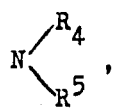

is also effected according to methods which are in themselves-known, by direct esterification or by conversion of VI into acid halides and reaction either with alcohols or with ammonia, primary or secondary amines.

It is however also possible to acylate compounds of the formula III and carboxylic acid esters and carboxylic acid amides of the general formula VII produced therefrom in a known or customary manner.

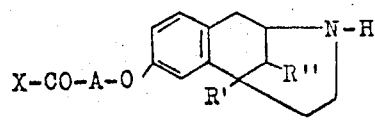   VII wherein R', R'' and A are as above defined, and X is OR''' or

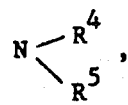

at the amine nitrogen, using compounds of the formula VIII

<p align="center">R⁶—CS—S—R⁷</p>

<p align="right">VIII</p> wherein
R⁶ is as above defined, and
R⁷ is an optionally substituted carboxymethyl or lower alkyl moiety.

The resulting compounds of the formula IX, in which X is OH, OR''' or

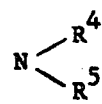

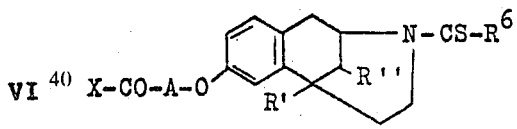   IX wherein R', R'', R''', R⁴, R⁵, R⁶, A and X are as above defined, can then be converted into the compounds of formula I, for example, by means of Raney nickel.

Instead of acylating the compounds of formulas III or VII, it is also possible to react them with reactive esters, such as halides or tosylates, of a hydroxyl compound of the formula X:

<p align="center">R—OH</p>

<p align="right">X</p> wherein R is as above defined,
in a manner which is per se known, to give the compounds according to the invention of the formula I.

Instead of compounds of the formula II, it is also possible to use for the production of the compounds according to the invention of the formula I, compounds of the formulas XI and XII.

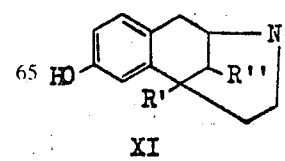   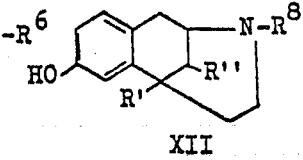

XI                XII wherein
R⁸ is a radical of an organic acid, preferably a cyanide, alkoxycarbonyl, aryloxycarbonyl or aliphatic carboxylic acid radical (with the exception of a cyclopropylcarbonyl and a cyclobutylcarbonyl radical) or an aromatic carboxylic acid radical, and R', R" and R⁶ are as above defined.

These compounds or their metal or ammonium salts are reacted in the presence of acid binding agents such as potassium carbonate, sodium hydroxide and the like with reactive esters, for example halides or tosylates, of hydroxyl compounds of the formula XIII:

$$Z-A-OH \qquad XIII$$

to give compounds of the formulas XIV and XV:

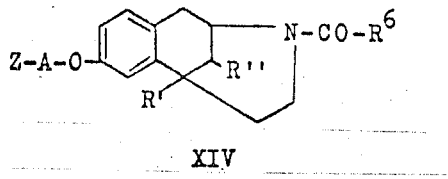

XIV

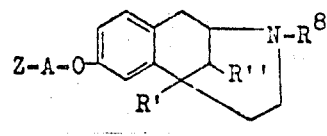

XV wherein
R', R", R⁶, R⁸, A and Z are as above defined.

The compounds of formula XV are desacylated at the nitrogen according to known methods and thereby converted into compounds of formula III, and the compounds of formula XIV are converted according to known methods into compounds of the formula V which are then further reacted — as described above — to give the compounds according to the invention of general formula I.

In the reaction of XI and XII with reactive esters of hydroxycarboxylic acids (formula XIII, Z = COOH) it is advisable to employ these in the form of their alkali salts.

Where, in the compounds according to the invention, of formula I, A is a bivalent carbon chain with two or more carbon atoms between the two free valencies, it is also possible to react compounds of the formula XII, or metal or ammonium salts thereof, in the presence of acid-binding agents such as potassium carbonate, sodium hydroxide and the like, with reactive esters, such as halides or tosylates, of hydroxyl compounds of the formula XVI:

$$Y - A - OH \qquad XVI$$

wherein
Y is a free or esterified hydroxyl group, and
A is as above defined,
to give compounds of the formula XVII.

XVII

These are then desacylated at the nitrogen according to methods per se known, subsequently converted according to methods per se known, for example, by means of acyl halides of the formula IV, into compounds of the formulas XVIII or XIX

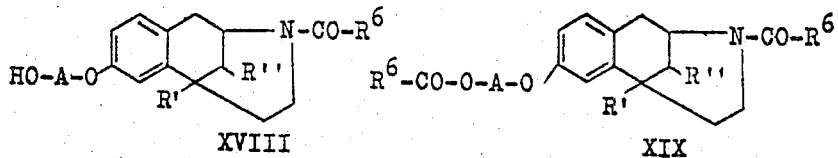

XVIII
XIX and, after reduction with suitable reducing agents, such as for example lithium alanate or diborane, converted into the reactive esters, such as halides or tosylates, of hydroxyl compounds of the formula XX

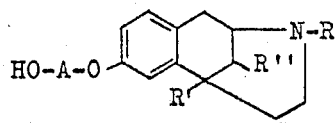

XX which are subsequently reacted with cyanides, such as for example potassium cyanide, to give compounds of the formula XXI

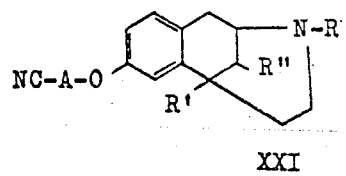

XXI wherein
R, R', R", R⁶ and A are as above defined.

The compounds of formula XVIII are also obtained if compounds of the formula XI or metal or ammonium salts thereof are reacted in the presence of acid-binding agents such as potassium carbonate, sodium hydroxide and the like, with reactive esters, such as halides or tosylates of hydroxyl compounds of formula XVI, and the ester group is subsequently saponified where appropriate.

The compounds of the formula XII are obtained, optionally after prior protection of the phenolic hydroxyl group, by, for example, reaction of benzomorphans of the formula XXII

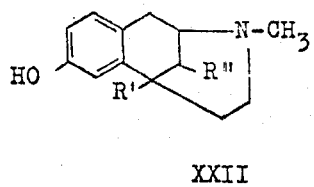

XXII with cyanogen bromide or chloroformic acid esters (for example U.S. Pat. No. 3,341,538), or by acylation of benzomorphans of the formula XXIII with acid halides, anhydrides or esters.

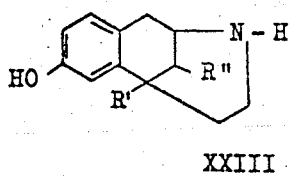

XXIII

The compounds of the formula XI are obtained by reaction of benzomorphans of formula XXIII with cyclopropylcarbonyl chloride or cyclobutylcarbonyl chloride (for example U.S. Pat. No. 3,372,165).

Instead of acylating the compounds of the formula XVII, after the desacylation at the nitrogen, with the acyl halides of formula IV, it is also possible to convert them, optionally after prior protection of the alcoholic hydroxyl group, by means of reactive esters such as halides or tosylates of alcohols of general formula X, in a manner which is in itself known, into compounds of the formula XX, which are subsequently reacted further as described.

Where, in the compounds according to the invention of formula I, A is a bivalent carbon chain with three or more carbon atoms between the two free valencies, it is also possible to employ compounds of the formula XXa

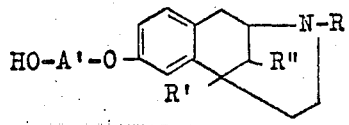

XXa wherein
A' is a carbon chain which is shorter by one $CH_2$ group, in accordance with the definition of A, and
R, R', R'' and Y are as above defined,
and which are obtained analogously to the compounds of formula XX using reactive esters, such as halides or tosylates, of hydroxyl compounds of the formula XVIa instead of formula XVI.

$$Y - A' - OH$$

XVIa

The compounds of formula XXa are converted into reactive esters, such as halides or tosylates, and subsequently converted, by means of a salt of a malonic ester, for example sodium malonic acid diethyl ester, into compounds of formula XXIV

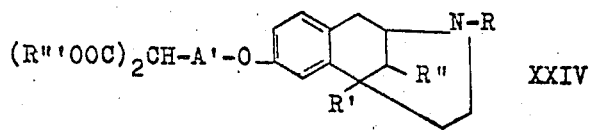

XXIV wherein
R, R', R'', R''' and A' are as above defined,
which are then reacted according to methods per se known, by decarboxylation after hydrolysis of both ester groups, to give compounds of formula I (with X = OH) or by decarboxylation after partial hydrolysis of one ester group to give compounds of formula I (with X = OR''').

The reactive esters of the compounds of formula XXa can also be converted by means of a salt of a cyanacetic ester, for example sodium cyanacetic acid ethyl ester, into compounds of the formula XXV

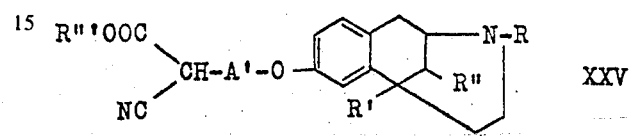

XXV wherein
R, R', R'', R''' and A' are as above defined,
which are then reacted according to methods per se known, by decarboxylation after hydrolysis of the ester group, to give compounds of formula XXI.

The compounds of the formula XXI are converted into the compounds of the formula I according to methods which are per se known. Thus, for example, the esters are obtained therefrom via the imide-ester hydrochlorides, or the amides or carboxylic acids or obtained by alkaline or acid hydrolysis.

It is furthermore possible to oxidize compounds of the formula XXb:

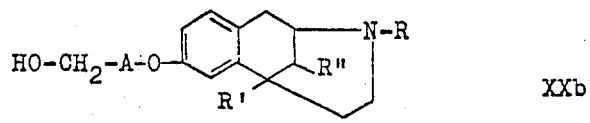

XXb which are obtained analogously to the compounds XX, using reactive esters of hydroxyl compounds of general formula XVIb $$Y - CH_2 - A - OH$$

XVIb and in which
R, R', R'', A and Y are as above defined,
to the compounds of formula I (X = OH) by oxidation with suitable oxidizing agents, such as, for example, potassium permanganate, for example in an acid aqueous solution.

The compounds of formula XX and XXb are also obtained by reduction of compounds of general formulae V and VI, or Va or VIa, or their esters

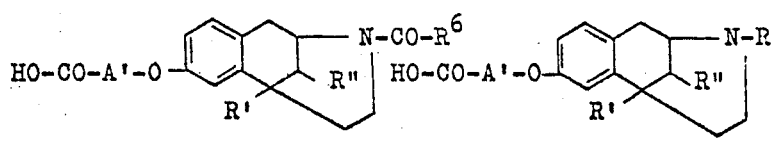

Va                    VIa wherein

R, R', R'', R[6], A and A' are as above defined, with suitable reducing agents, such as for example lithium alanate or diborane.

The compounds of formulas Va and VIa are produced analogously to the compounds V and VI using reactive esters, such as halides or tosylates of hydroxyl compounds of the formula XIIIa instead of XIII, in which Z and A' are as above defined.

$$Z - A' - OH$$

XIIIa

Of course, the compounds of the formula I, thus obtained, can also be converted into one another according to methods per se known. Thus it is for example possible to obtain the esters (X = OR''') from the carboxylic acids (X = OH) by direct esterification or via the corresponding acid halides, and to obtain the acid amides

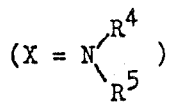

by reaction of the acid halides with ammonia, primary or secondary aliphatic amines. The carboxylic acid esters (X = OR''') can be converted into the carboxylic acids (X = OH) by hydrolysis or can be converted to the acid amides

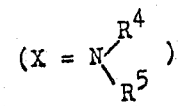

by reaction with ammonia, primary or secondary aliphatic amines, and the acid amides can be converted to carboxylic acids by hydrolysis.

These possible conversions are intended to be explained by the scheme of formulae which follows.

The benzomorphans of the formula II which are used as starting materials for the compounds of the present invention may be produced according to the process set forth in copending U.S. application Ser. No. 37,331 filed May 14, 1970. Generally this process comprises reacting benzomorphans of the formula XII:

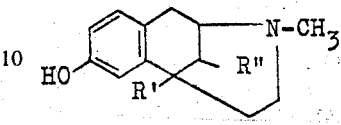

XII wherein R' and R'' are as above defined, or metal or ammonium salts thereof, in the presence of acid-binding agents such as potassium carbonate, sodium hydroxide and the like, with reactive esters for example halides or tosylates of hydroxyl compounds of the formula XIII:

$$Z - A - OH$$

XIII wherein A and Z are as above defined. Compounds XXII can, for example, be obtained according to the process set forth in British Pat. No. 1,078,286, U.S. application Ser. No. 559,079 filed June 21, 1966 or according to J. Med. Chem. 7, 123 (1964).

The above reaction, that is of compounds of formula XXII, can be carried out in an aqueous medium or in organic solvents such as tetrahydrofuran, acetone, dimethylformamide and the like, at room temperature or at an elevated temperature. Normally the boiling point of the particular solvent is selected as the reaction temperature.

In the case of the reaction of XXII, as also of XI and XII, with reactive esters of hydroxycarboxylic acids (general formula XIII, Z = HOOC) it is advisable to employ these in the form of their alkali salts.

Of course it is also possible to convert the compounds of formula II thus obtained, as also of formulae XIV and XV, mutually into one another according to

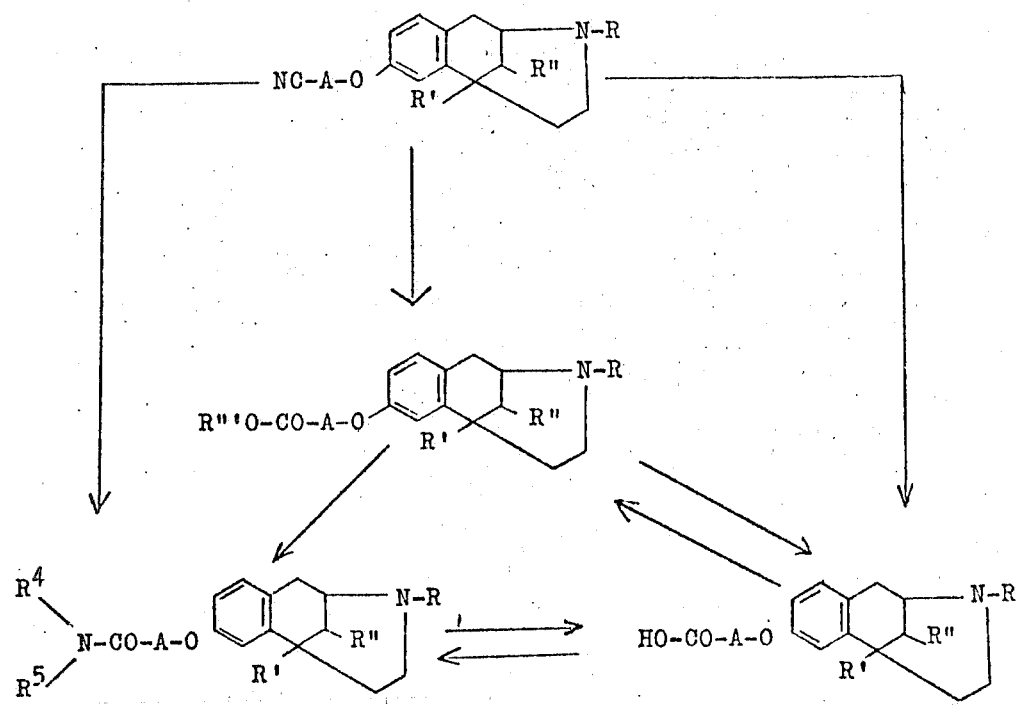

known methods. Thus it is for example possible to convert the nitriles via imide-esters into the esters and carboxylic acids, or by hydrolysis into the primary acid amides and carboxylic acids.

Starting from the carboxylic acids, it is possible to obtain the esters by direct esterification or via the corresponding acid halides or to obtain the acid amides by reaction of the acid halides with ammonia, primary or secondary aliphatic amines. The carboxylic acid esters can be converted into the carboxylic acids by hydrolysis or into the acid amides by reaction with ammonia, primary or secondary amines, and the acid amides can be converted to the carboxylic acids by hydrolysis.

The compounds of formula II can, depending on the chosen method of manufacture and working up, either be obtained as such or in the form of their salts, for example as sodium or potassium salts in the case of the carboxylic acids, or also as hydrochlorides, sulphates, phosphate and the like. The liberation of the aminoacids, aminoacid-esters, aminoacid-amides and aminonitriles on which the salts are based, as well as the conversion of these compounds into their salts, takes place according to known or customary methods.

The new compounds I and their pharmaceutically acceptable non-toxic salts, such as for example alkali salts, hydrochlorides, sulphates, phosphates, tartrates, citrates, fumarates, maleates, naphthalenedisulphonates and the like are useful as analgesics for administration to humans.

The compounds according to the present invention depending upon the particular process of production can either be obtained as such or in the form of their non-toxic salts, for example, as sodium or potassium salts in the case of the carboxylic acids as well as hydrochlorides, sulphates, phosphates and the like. These compounds and their salts can be administered as such or in the form of pharmaceutical compositions according to techniques per se well known in the pharmaceutical field. Thus, for oral administration these compounds or their salts may be formed into tablets, dragees, capsules and the like, or for injection they may be formed into suitable solutions using pharmaceutically accepted inert diluents and/or carriers.

Depending upon the strength of the analgesic activity desired, the severity of the patient's condition, the past medical history of the patient and the normal factors taken into consideration in prescribing dosage ranges, the compounds of the present invention may be administered in dosages of 1–100 mg parenterally or enterally, from 1 to 4 times daily.

Results of the pharmacological investigations

Table 1 sets forth comparative data on compounds of the present invention as compared to morphine, codeine and pethidine. Table 2 sets forth representative compounds according to the present invention which were tested.

Thus, Table 1 shows the analgesic effects and the compatibility including toxicity and therapeutic index of compounds representative of the present invention as compared to morphine, codeine and pethidine which are known addiction-cauing analgesics.

The toxicity ($LD_{50}$) was determined in rats on subcutaneous administration and the analgesic effect was determined in the heat ray test on the tail of a rat. The therapeutic index ($LD_{50} : ED_{50}$) was calculated from the two values obtained in these investigations.

A test was further carried out as to whether the products of the process can replace morphine in morphine-dependent monkeys or whether morphine-antagonistic effects are present.

As can be seen from Table 1, compound 1 exerts a strong analgesic effect and provokes withdrawal symptoms in morphine-dependent monkeys, that is to say the substance is a distinctly to strongly active morphine-antagonistic agent.

In the case of substances which can cancel the effects of morphine, experience hitherto has shown that a priori the development of a morphine-like addiction or dependence is not to be expected in man.

Compound 2, because of its good toleration, i.e., its low toxicity makes it well tolerated, has a significantly higher therapeutic index than morphine and the other narcotic analgesics employed for comparison.

Compounds 3, 4, 5, 6, 7 and 8 are, similarly to 1, distinctly to strongly active morphine-antagonists. What has been said about 1 therefore applies to them. Of these compounds, 3, 4, 5, 6 and 8 furthermore have a considerably stronger analgesic effect than morphine. Because of their good toleration, the compounds 2 to 8 have a considerably higher therapeutic index than the comparison products.

Compounds 9, 10 and 11 are not morphine-antagonists, but cancel the withdrawal symptoms of morphine-dependent monkeys only at higher doses than the comparison products.

Compound 11 exhibits approximately the same level of analgesic activity as morphine, but has a higher therapeutic index than the latter. Compound 10 has also a higher therapeutic index than morphine and the other analgesics employed for comparison.

Summary

The compounds according to the present invention, described in Table 1, were compared in respect of analgesic effect, toxicity, i.e., toleration and addiction-causing properties with morphine, codeine and pethidine. They are superior to the comparison products in at least one of these criteria.

Table 1

| Substance | Toxicity Rat LD 50 mg/kg s.c. | Analgesic effect Heat ray test on the tail of a rat ED 50 mg/kg s.c. | Therapeutic Index LD 50 / ED 50 | Morphine replacement effect on morphine-dependent monkeys (cancellation of withdrawal symptoms) mg/kg s.c. | Morphine-antagonistic effect on morphine-dependent monkeys (provocation of withdrawal symptoms) mg/kg s.c. |
|---|---|---|---|---|---|
| Morphine | 105 (65–185) | 1.52 (0.66–2.23) | 69 | from 2 | ++ |

Table 1—Continued

| Substance | Toxicity Rat LD 50 mg/kg s.c. | Analgesic effect Heat ray test on the tail of a rat ED 50 mg/kg s.c. | Therapeutic Index LD 50 / ED 50 | Morphine replacement effect on morphine-dependent monkeys (cancellation of withdrawal symptoms) mg/kg s.c. | | Morphine-antagonistic effect on morphine-dependent monkeys (provocation of withdrawal symptoms) mg/kg s.c. | |
| --- | --- | --- | --- | --- | --- | --- | --- |
| Codeine | 229 (139–374) | 4.5 (3.6–5.9) | 51 | from 3 from 12 | : + : ++ | | |
| Pethidine | 112 (84–136) | 5.7 (3.7–7.3) | 20 | from 1 from 1.6 | : + : ++ | | |
| 1 | — | 2.9 (0.85–8.3) | — | | | up to 0.3 from 1 from 4 | : insignificant : + : ++ |
| 2 | ~1800 | <5 | >360 | | | | |
| 3 | >500 | 0.43 (0.19–0.88) | >1160 | | | from 0.3 from 3 | : + : ++ |
| 4 | >250 | ~0.6 | >417 | | | from 1 | : + |
| 5 | ~1000 | 0.31 (0.16–0.55) | 3125 | | | from 1 | : + |
| 6 | ~2250 | 0.58 (0.22–1.29) | ~3880 | | | up to 0.1 from 0.3 from 5 | : insignificant : + : ++ |
| 7 | >800 | 2.44 (0.7–10.4) | >328 | | | up to 0.3 from 1 | : insignificant : + |
| 8 | >250 | 0.54 (0.22–1.3) | >463 | | | up to 0.1 from 0.3 from 3 | : insignificant : + : ++ |
| 9 | >250 | <5 | > 50 | from 6 | : ++ | | |
| 10 | >250 | ~2.5 | >100 | from 6 | : ++ | | |
| 11 | >250 | ~1.6 | >156 | from 6 | : ++ | | |

+ : slight cancellation; or provocation
++ : distinct or complete cancellation or provocation Table 2

1 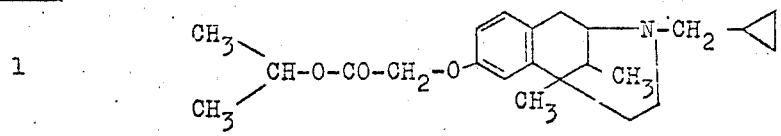

2 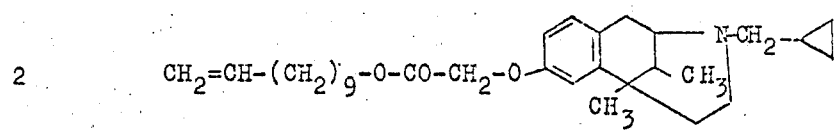

3 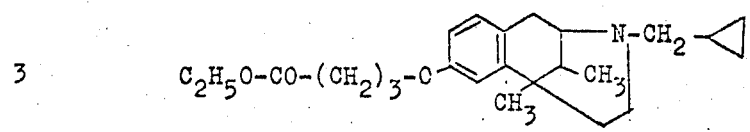

4 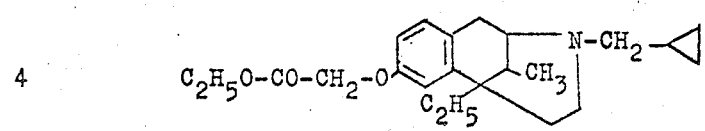

Table 2 — Continued

5  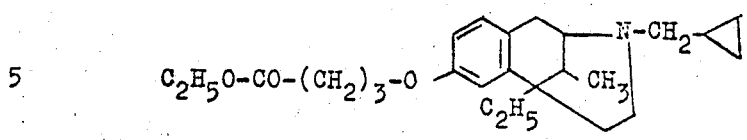

6  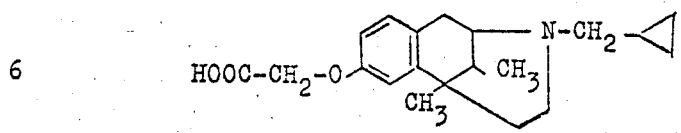

7  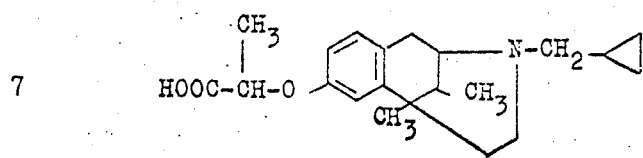

8  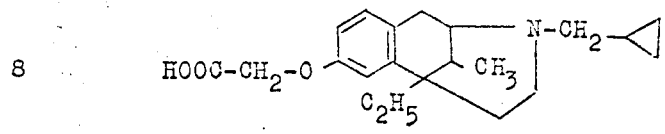

9  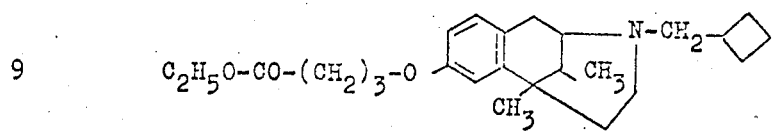

10  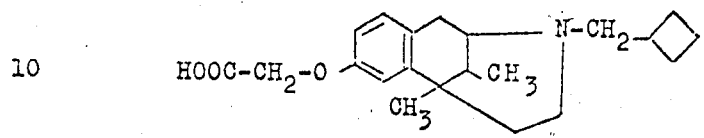

11  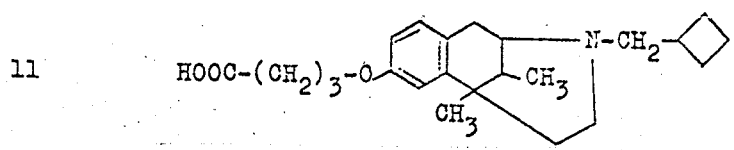

EXAMPLE 1

A solution of 34.5 g of 2,5,9-trimethyl-2'-[3-ethoxycarbonyl-propoxy-(1)]-6,7-benzomorphan (or 29.8 g of nitrile or 31.7 g of carboxylic acid or 31.6 g of amide) in 250 ccs of dry chloroform is added dropwise, over the course of 1.5 hours, to 11.6 g of cyanogen bromide in 250 ccs of dry chloroform, while stirring and cooling with ice. Thereafter the mixture is heated for 3 hours under reflux, the solvent is distilled off in vacuo to dryness, and the residue is stirred for 15 hours under reflux with 550 ccs of 6% strength hydrochloric acid. After adding active charcoal, the mixture is filtered hot and the filtrate evaporated to dryness in vacuo. The residue is taken up in water, mixed with 12.0 g of sodium hydroxide in a little water, and the mixture again evaporated to dryness in vacuo. The resulting mixture of the sodium salt of 5,9-dimethyl-2'-[3-carboxypropoxy-(1)]-6,7-benzomorphan and sodium chloride is processed further in the crude state.

To do so, 250 ccs of water are added, 13.6 g of cyclopropanecarboxylic acid chloride and 27.5 ccs of 4 N sodium hydroxide solution are simultaneously added dropwise at room temperature while stirring, and the mixture is stirred for a further 2 hours. The reaction mixture is acidified with hydrochloric acid and extracted with benzene-butanol mixture. The extract is dried over sodium sulphate and evaporated to dryness in vacuo.

The crude 2-cyclopropylcarbonyl-5,9-dimethyl-2'-[3-carboxy-propoxy-(1)]-6,7-benzomorphan is dissolved in 150 ccs of dry ethylene chloride and mixed with 17.8 of thionyl chloride. Thereafter the whole is heated under reflux until the evolution of gas has ceased, and is evaporated to dryness in vacuo.

The crude 2-cyclopropylcarbonyl-5,9-dimethyl-2'-[3-chlorocarbonylpropoxy-(1)]-6,7-benzomorphan is dissolved in 150 ccs of dry tetrahydrofurane. This solution is added dropwise over the course of one-half hour, at 0°, to a solution of 2.3 g of diborane in 100 ccs of dry tetrahydrofurane. Thereafter the mixture is stirred for 1 hour under reflux and the complex is then decomposed at room temperature by dropwise addition of 25 ccs of 6 N hydrochloric acid. The solution is now evaporated to dryness in vacuo, the residue is mixed with absolute benzene, and the benzene is distilled off, after which the dry residue is mixed with 150 ccs of absolute ethanol and esterified by 4 hours' boiling under reflux while passing in hydrogen chloride. Thereafter the ethanol is evaporated off, the residue is taken up in water while cooling with ice, insoluble constituents are removed by filtering off and by extraction with ether, and the aqueous solution is rendered alkaline with sodium hydroxide solution while cooling with ice and is immediately extracted with ether. The extract is dried over sodium sulphate, evaporated and distilled. The 2-cyclopropylmethyl-5,9-dimethyl-2'-[3-ethoxycarbonylpropoxy-(1)]-6,7-benzomorphan boils at 204°–212°/0.15 mm Hg.

Starting from 2,5,9-trimethyl-2'-(α-ethoxycarbonyl-p-nitrobenzyloxy)-6,7-benzomorphan, 2-cyclopropylmethyl-5,9-2'-(α-ethoxycarbonyl-p-nitrobenzyloxy)-6,7-benzomorphan was produced by analogous procedure. Melting point of the hydrochloride: 127°–129° (decomposition).

EXAMPLE 2

34.5 g of 2,5,9-trimethyl-2'-[3-ethoxycarbonylpropoxy-(1)]-6,7-benzomorphan are dissolved in 100 ccs of dry acetone and 20 g of azodicarboxylic acid diethyl ester are added over the course of 30 minutes, whereupon the solution becomes somewhat warmer. The mixture is stirred for a further hour at room temperature and the acetone is then distilled off in vacuo. The residue is heated with 110 ccs of 1 N hydrochloric acid on a waterbath until the odor of formaldehyde has disappeared. The solution is filtered and extracted with ether, the aqueous solution is evaporated to dryness in vacuo, and the crude 5,9-dimethyl-2'-[3-carboxypropoxy-(1)]-6,7-benzomorphan hydrochloride is taken up in 150 ccs of absolute ethanol and esterified under reflux, while passing in hydrogen chloride, as described under Example 1. After distilling off the ethanol in vacuo, the residue is dissolved in water, the solution is rendered alkaline with sodium hydroxide solution while cooling with ice and the 5,9-dimethyl-2'-[3-ethoxycarbonylpropoxy-(1)]-6,7-benzomorphan is extracted with benzene. The extract is dried over sodium sulphate and evaporated.

The residue is dissolved in 150 ccs of acetone and is added at room temperature to a solution of 17.6 g of cyclopropanedithiocarboxylic acid carboxymethyl ester (manufactured by reaction of cyclopropylmagnesium bromide with carbon disulphide and subsequent esterification with chloracetic acid) in 100 ccs of 1 N sodium hydroxide solution. The mixture is stirred for a further 2 hours at room temperature and diluted with 100 ccs of water, and the oil is taken up in methylene chloride. After drying over sodium sulphate, the solution is evaporated to dryness.

The 2-cyclopropylthiocarbonyl-5,9-dimethyl-2'-[3-ethoxycarbonylpropoxy-(1)]-6,7-benzomorphan thus produced is dissolved in 250 ccs of dry ethanol, mixed with 55 g of Raney nickel, and the mixture stirred for 5 hours at room temperature. After filtering, the filtrate is evaporated and the residue is distilled in a high vacuum. The 2-cyclopropylmethyl-5,9-dimethyl-2'-[3-ethoxycarbonylpropoxy-(1)]-6,7-benzomorphan agrees in all properties with the product manufactured according to Example 1.

EXAMPLE 3

A solution of 34.5 g of 2,5,9-trimethyl-2'-[3-ethoxycarbonylpropoxy-(1)]-6,7-benzomorphan in 500 ccs of absolute benzene is mixed with 47.0 g of chloroformic acid phenyl ester and the mixture is heated for 20 hours under reflux. Thereafter it is evaporated to dryness, initially under a waterpump vacuum and finally under an oilpump vacuum.

The crude 5,9-dimethyl-2-phenoxycarbonyl-2'-[3-ethoxycarbonylpropoxy-(1)]-6,7-benzomorphan is stirred for 24 hours under reflux with a solution of 39.2 g of potassium hydroxide in 500 ccs of n-butanol. The mixture is evaporated to dryness in vacuo, and the residue is taken up in 150 ccs of absolute ethanol and esterified by 4 hours boiling under reflux while passing in hydrogen chloride. Thereafter the mixture is evaporated to dryness in vacuo, the residue is taken up in water while cooling with ice, insoluble constituents are removed by filtering off and extraction with ether, and the aqueous solution is rendered alkaline with sodium hydroxide solution while cooling with ice. The 5,9-dimethyl-2'-[3-ethoxycarbonylpropoxy-(1)]-6,7-benzomorphan is immediately extracted with ether and after drying over sodium sulphate and distilling off the ether is further processed in the crude state.

To do so, it is dissolved in 150 ccs of dry pyridine, 10.5 g of cyclopropanecarboxylic acid chloride are added dropwise at room temperature, and the mixture is stirred for a further 5 hours at room temperature. The reaction mixture is subsequently concentrated in vacuo, and the residue is taken up in dilute hydrochloric acid and extracted with ether. The ether solution is washed with water, dried over sodium sulphate and evaporated. The crude 2-cyclopropylcarbonyl-5,9-dimethyl-2'-[3-ethoxycarbonylpropoxy-(1)]-6,7-benzomorphan is subsequently saponified to the carboxylic acid with potassium hydroxide in methanol, under reflux, and is thereafter reduced with diborane analogously to Example 1, after conversion into the acid chloride, to give 2-cyclopropylmethyl-5,9-dimethyl-2'-[3-chlorocarbonylpropoxy-(1)]-6,7-benzomorphan, which after hydrolysis with water yields 2-cyclopropylmethyl-5,9-dimethyl-2'-[3-carboxypropoxy-(1)]-6,7-benzomorphan. Melting point of the sodium salt: 110° (decomposition).

EXAMPLE 4

A solution of 33.1 g of 5,9-dimethyl-2'-[3-ethoxycarbonylpropoxy-(1)]-6,7-benzomorphan (manufactured according to Example 2 or 3) in 300 ccs of absolute ethanol is mixed with 8.5 g of sodium hydrogen carbonate and subsequently with 9.1 g of cyclopropylmethyl chloride. The mixture is stirred overnight under reflux and evaporated to dryness in vacuo, the residue is distributed between water and ether, and the ether phase is dried over sodium sulphate and evaporated to dryness in vacuo. The resulting 2-cyclopropylmethyl-5,9-dimethyl-2'-[ethoxycarbonylpropoxy-(1)]-6,7-benzomorphan is purified by vacuum distillation and is identical with the compound described under Example 1.

EXAMPLE 5

28.5 g of 2-cyclopropylcarbonyl-5,9-dimethyl-2'-hydroxy-6,7-benzomorphan are suspended in 200 ccs of absolute methanol and mixed with 50 ccs of a 2-normal sodium methylate solution. The mixture is stirred for one-half hour under reflux and evaporated to dryness in vacuo, and the residue is mixed with 50 ccs of absolute benzene and again evaporated to dryness. The residue is dissolved in 200 ccs of absolute dimethylformamide, 20.5 g of γ-bromobutyric acid ethyl ester are added dropwise and the mixture is subsequently stirred for 18 hours at 60°C and evaporated to dryness in vacuo, and the residue is distributed between water and ether; after separating off the ether phase, the aqueous phase is extracted with ether twice more and is evaporated to dryness. The residue, consisting of 2-cyclopropylcarbonyl-5,9-dimethyl-2'-[3-ethoxycarbonylpropoxy-(1)]-6,7-benzomorphan, is subsequently saponified with potassium hydroxide in methanol, under reflux, to give the carboxylic acid and is thereafter reduced with diborane after conversion into the acid chloride, analogously to Example 1, to give 2-cyclopropylmethyl-5,9-dimethyl-2'-[3-chlorocarbonylpropoxy-(1)]-6,7-benzomorphan, which after hydrolysis with water yields 2-cyclopropylmethyl-5,9-dimethyl-2'-[3-carboxypropoxy-(1)]-6,7-benzomorphan. Melting point of the sodium salt: 110°C (decomposition).

EXAMPLE 6

25.6 g of 2-cyan-5-ethyl-9-methyl-2'-hydroxy-6,7-benzomorphan are suspended in 200 ccs of absolute methanol and mixed with 50 ccs of a 2-normal sodium methylate solution. The mixture is stirred for one-half hour under reflux and evaporated to dryness in vacuo, 50 ccs of absolute benzene are added, and the mixture again evaporated to dryness. The residue is dissolved in 200 ccs of dry dimethylformamide, 20.5 g of α-bromobutyric acid ethyl ester are added dropwise, the mixture is subsequently stirred for 18 hours at 60°C and evaporated to dryness in vacuo, and the residue is distributed between water and a mixture of 2 parts of ether and 1 part of methylene chloride. The organic phase is dried over sodium sulphate and evaporated. The crude 2-cyan-5-ethyl-9-methyl-2'-[3-ethoxycarbonylpropoxy-(1)]-6,7-benzomorphan is stirred for 15 hours under reflux with 550 ccs of 6% strength hydrochloric acid. After adding active charcoal, the mixture is filtered hot and the filtrate is evaporated to dryness in vacuo. The residue is taken up in water, mixed with 12.0 g of sodium hydroxide in a little water, and again evaporated to dryness in vacuo. The resulting mixture of the sodium salt of 5-ethyl-9-methyl-2'-[3-carboxypropoxy-(1)]-6,7-benzomorphan and sodium chloride is further processed in the crude state, as described in Example 1, and finally yields 2-cyclopropylmethyl-5-ethyl-9-methyl-2'-[3-ethoxycarbonylpropoxy-(1)]-6,7-benzomorphan of boiling point 202° to 210°C/0.25 mm Hg.

The same compound is obtained if instead of 2-cyano-5-ethyl-9-methyl-2'-hydroxy-6,7-benzomorphan 2-acetyl-5-ethyl-9-methyl-2'-hydroxy-6,7-benzomorphan is employed.

EXAMPLE 7

35.1 g of 5-ethyl-9-methyl-2-phenoxycarbonyl-2'-hydroxy-6,7-benzomorphan are suspended in 200 ccs of absolute methanol and mixed with 50 ccs of a 2-normal sodium methylate solution. The mixture is stirred for one-half hour under reflux and evaporated to dryness in vacuo, the residue is treated with 50 ccs of absolute benzene and the mixture again evaporated to dryness. The residue is taken up in 200 ccs of absolute dimethylformamide and is then mixed with 20.5 g of γ-bromobutyric acid ethyl ester at room temperature. The mixture is stirred for 18 hours at 60° and evaporated to dryness in vacuo, and the residue is distributed between water and a mixture of 2 parts of ether and 1 part of methylene chloride. The organic phase is dried over sodium sulphate and evaporated. The 5-ethyl-9-methyl-2-phenoxycarbonyl-2'-[3-ethoxycarbonylpropoxy-(1)]-6,7-benzomorphan thus obtained is stirred for 24 hours, under reflux, with a solution of 39.2 g of potassium hydroxide in 500 ccs of n-butanol. The mixture is evaporated to dryness in vacuo, and the residue is taken up in 150 ccs of absolute ethanol and esterified by 4 hours boiling under reflux while passing in hydrogen chloride. Thereafter it is evaporated to dryness in vacuo, the residue is taken up in water while cooling with ice, insoluble constituents are removed by filtering and extraction with ether, and the aqueous solution is rendered alkaline with sodium hydroxide solution while cooling with ice. The 5-ethyl-9-methyl-2'-[3-ethoxycarbonylpropoxy-(1)]-6,7-benzomorphan is immediately extracted with ether and after drying over sodium sulphate and distilling off the ether is further processed in the crude state as described in Example 4, and finally yields 2-cyclopropylmethyl-5-ethyl-9-methyl-2'-[3-ethoxycarbonylpropoxy-(1)]-6,7-benzomorphan, which is identical with the compound described under Example 6.

EXAMPLE 8

25.6 g of 2-cyano-5-ethyl-9-methyl-2'-hydroxy-6,7-benzomorphan are suspended in 200 ccs of absolute methanol and mixed with 50 ccs of a 2-normal sodium methylate solution. The mixture is stirred for one-half hour under reflux and is evaporated to dryness in vacuo, the residue is mixed with 50 ccs of absolute benzene and the mixture is again evaporated to dryness. The residue is taken up in 200 ccs of absolute dimethylformamide and is then mixed dropwise, at room temperature, with 13.9 g of 3-bromopropanol-1. Thereafter the mixture is stirred for 18 hours at 60° and evaporated to dryness in vacuo, and the residue is distributed between water and a mixture of 2 parts of ether and 1 part of methylene chloride. The organic phase is dried over sodium sulphate and evaporated. The residue consisting of 2-cyano-5-ethyl-9-methyl-2'-[3-hydroxypropoxy-(1)]-6,7-benzomorphan is stirred for 15 hours under reflux with 550 ccs of 6% strength hydrochloric acid. After adding active charcoal, the mixture is filtered hot and the filtrate is evaporated to dryness in vacuo. The residue is dissolved in water and rendered alkaline with sodium hydroxide solution. The whole is extracted with a mixture of 2 parts of ether and 1 part of methylene chloride, and the extract is dried over sodium sulphate and evaporated to dryness in vacuo.

The residue, consisting of 5-ethyl-9-methyl-2'-[3-hydroxypropoxy-(1)]-6,7-benzomorphan, is dissolved in 100 ccs of dry pyridine and 100 ccs of absolute benzene and is slowly mixed at room temperature with 11.0 g of cyclopropanecarboxylic acid chloride. The mixture is stirred for a further 3 hours and evaporated to dryness in vacuo, and the residue is taken up in water and extracted with methylene chloride. After drying over sodium sulphate, the extract is evaporated. The crude 2-cyclopropylcarbonyl-5-ethyl-9-methyl-2'-[3-hydroxypropoxy-(1)]-6,7-benzomorphan is dissolved in 300 ccs of dry tetrahydrofurane and added dropwise, at about 30°, to a suspension of 7.6 g of lithium alanate in 200 ccs of dry tetrahydrofurane. The mixture is stirred for a further 5 hours under reflux, subsequently decomposed, while cooling with ice, by careful dropwise addition of 15.2 ccs of 20% strength sodium hydroxide solution, stirred for a further 2 hours at room temperature and filtered. The filter cake is boiled 3 times with 100 ccs of benzene at a time. The filtrates are jointly evaporated in vacuo. The crude 2-cyclopropylmethyl-5-ethyl-9-methyl-2'-[3-hydroxypropoxy-(1)]-6,7-benzomorphan is purified by distillation, b.p. 220° – 224° C/0.01 mm Hg. Yield 15.89.

The crude product can, without purification be dissolved in 150 ccs of dry ethylene chloride, and after saturation with hydrogen chloride is mixed with 14.8 g of thionyl chloride. The mixture is heated under reflux until the evolution of gas has ceased, and evaporated to dryness in vacuo, and the crude 2-cyclopropylmethyl-5-ethyl-9-methyl-2'-[3-chloropropoxy-(1)]-6,7-benzomorphan hydrochloride is taken up in 200 ccs of dry dimethylformamide and added to 15 g of potassiusm cyanide in 50 ccs of dry dimethylformamide. The mixture is stirred for 15 hours at 80°, the solvent is evaporated off in vacuo, the residue is taken up in water, sodium hydroxide solution is added and the mixture is extracted with ether. The extract is dried over sodium sulphate and evaporated, and the residue is distilled. The 2-cyclopropylmethyl-5-ethyl-9-methyl-2'-[3-cyanopropoxy-(1)]-6,7-benzomorphan boils at 204°–206°/0.1 mm Hg.

1.5 g of hydrogen chloride are passed into a solution of 7.05 g of the cyanopropoxy compound in 30 ccs of absolute ethanol, while cooling. The reaction mixture is left to stand for 2 hours at room temperature and is evaporated to dryness in vacuo. The residue is taken up in water and stirred for 10 minutes, and the solution is covered with a layer of ether and rendered alkaline with dilute sodium hydroxide solution, while cooling. After separating off the ether phase, the aqueous phase is twice more extracted with ether. The combined ether solutions are dried over sodium sulphate, concentrated and distilled. The 2-cyclopropylmethyl-5-ethyl-9-methyl-2'-[3-ethoxycarbonylpropoxy-(1)]-6,7-benzomorphan boils at 202° to 210°/0.25 mm Hg.

The same compound is obtained if instead of 2-cyano-5-ethyl-9-methyl-2'-hydroxy-6,7-benzomorphan 2-acetyl-5-ethyl-9-methyl-2'-hydroxy-6,7-benzomorphan is employed.

EXAMPLE 9

29.9 g of 2-cyclopropylcarbonyl-5-ethyl-9-methyl-2'-hydroxy-6,7-benzomorphan are suspended in 200 ccs of absolute methanol and mixed with 50 ccs of a 2-normal sodium methylate solution. The mixture is stirred for one-half hour under reflux and is evaporated to dryness in vacuo, the residue is mixed with 50 ccs of absolute benzene and the mixture again evaporated to dryness. The residue is dissolved in 200 ccs of absolute dimethylformamide, 13.9 g of 3-bromopropanol-1 are added thereto at room temperature, the mixture is subsequently stirred for 18 hours at 60° and evaporated to dryness in vacuo, the residue is taken up in water and the solution extracted with methylene chloride. After drying over sodium sulphate and evaporating off the solvent, the crude 2-cyclopropylcarbonyl-5-ethyl-9-methyl-2'-[3-hydroxypropoxy-(1)]-6,7-benzomorphan is further processed as described in Example 8 and finally yields 2-cyclopropylmethyl-5-ethyl-9-methyl-2'-[3-ethoxycarbonylpropoxy-(1)]- 6,7-benzomorphan.

EXAMPLE 10

35.1 g of 5-ethyl-9-methyl-2-phenoxycarbonyl-2'-hydroxy-6,7-benzomorphan are suspended in 200 ccs of absolute methanol and mixed with 50 ccs of a 2-normal sodium methylate solution. The mixture is stirred for one-half hour under reflux and evaporated to dryness in vacuo, and the residue is mixed with 50 ccs of absolute benzene and again evaporated. The residue is taken up in 200 ccs of absolute dimethylformamide and is then treated dropwise, at room temperature, with 16.5 g of 3-acetoxy-1-bromopropane. The mixture is stirred for 18 hours at 60° and evaporated to dryness in vacuo, and the residue is distributed between water and a mixture of 2 parts of ether and 1 part of methylene chloride. The organic phase is dried over sodium sulphate and evaporated.

The 5-ethyl-9-methyl-2-phenoxycarbonyl-2'-[3-acetoxy-propoxy-(1)]-6,7-benzomorphan thus obtained is stirred for 24 hours under reflux with a solution of 39.2 g of potassium hydroxide in 500 ccs of n-butanol. The mixture is evaporated to dryness in vacuo, the residue is taken up in dilute hydrochloric acid, and insoluble constituents are removed by extraction by shaking with ether. The aqueous phase is rendered alkaline with sodium hydroxide solution and is extracted with a mixture of 2 parts of ether and 1 part of methylene chloride. After drying over sodium sulphate and distilling off the solvent, 5-ethyl-9-methyl-2'-[3-hydroxypropoxy-(1)]-6,7-benzomorphan is obtained, which is further processed as described in Example 8 to give 2-cyclopropylmethyl-5-ethyl-9-methyl-2'-[3-ethoxycarbonylpropoxy-(1)]-6,7-benzomorphan.

EXAMPLE 11

A solution of 28.9 g of 5-ethyl-9-methyl-2'-[3-hydroxypropoxy-(1)]-6,7-benzomorphan (manufactured according to Example 8 or 10) in 300 ccs of absolute ethanol is mixed with 8.5 g of sodium hydrogen carbonate and subsequently with 9.1 g of cyclopropylmethyl chloride. The mixture is stirred overnight under reflux and evaporated to dryness in vacuo, the residue is distributed between water and ether, and the ether phase is dried over sodium sulphate and evaporated to dryness in vacuo. The residue, consisting of 2-cyclopropylmethyl-5-ethyl-9-methyl-2'-[3-hydroxypropoxy-(1)]-6,7-benzomorphan, is purified by distillation, b.p. 220°–224° C/0.01 mm Hg. Yield 20.3 g.

The residue can, without purification be processed as described in Example 8 to give 2-cyclopropylmethyl-5-ethyl-9-methyl-2'-[3-ethoxycarbonylpropoxy-(1-]-6,7-benzomorphan.

EXAMPLE 12

3.8 g of 2-cyclopropylmethyl-5,9-dimethyl-2'-[3-ethoxycarbonylpropoxy-(1)]-6,7-benzomorphan (manufactured according to Example 1, 2 or 4) are dissolved in 50 ccs of absolute ether, and the solution is mixed with 5 ccs of a 2-normal solution of sodium hydroxide in methanol and left to stand for 24 hours at room temperature. It is then evaporated to dryness in vacuo and the residue is caused to crystallize by trituration with absolute ether. The product is filtered off, rinsed with absolute ether and dried in vacuo. The sodium salt of the 2-cyclopropylmethyl-5,9-dimethyl-2'-[3-carboxypropoxy-(1)]-6,7-benzomorphan agrees in all properties with the product manufactured according to Example 3.

EXAMPLE 13

A solution of 3.8 g of 2-cyclopropylmethyl-5,9-dimethyl-2'-[3-ethoxycarbonylpropoxy-(1)]-6,7-benzomorphan in 100 ccs of ethanol is saturated with ammonia and heated for several hours in an autoclave to 80°–100°. After evaporation, 2-cyclopropylmethyl-5,9-dimethyl-2'-[3-carbamoylpropoxy-(1)]-6,7-benzomorphan is obtained. Melting point of the hydrochloride: 176°–179°.

EXAMPLE 14

A solution of 3.7 g of 2-cyclopropylmethyl-5,9-dimethyl-2'-[3-carbamoylpropoxy-(1)]-6,7-benzomorphan (manufactured according to Example 13) in 30 ccs of concentrated hydrochloric acid is stirred for 10 hours under reflux. It is subsequently evaporated to dryness, the residue is taken up in water, and a solution of 1.2 g of sodium hydroxide in water is added. After evaporation, a solid residue is obtained, which is treated with absolute ethanol. The sodium chloride is filtered off, the filtrate is again evaporated to dryness, and the residue is triturated with absolute ether, filtered off and dried in vacuo. The sodium salt of 2-cyclopropylmethyl-5,9-dimethyl-2'-[3-carboxypropoxy-(1)]-6,7-benzomorphan thus obtained, is identical with the product obtained according to Example 3.

EXAMPLE 15

A mixture of 7.1 g of 2-cyclopropylmethyl-5,9-dimethyl-2'-[3-carboxypropoxy-(1)]-6,7-benzomorphan, 4.8 g of thionyl chloride and 50 ccs of ethylene chloride is heated under reflux until the evolution of gas has ceased. It is then evaporated to dryness in vacuo. The residue consists of the hydrochloride of 2-cyclopropylmethyl-5,9-dimethyl-2'-[3-chlorocarbonylpropoxy-(1)]-6,7-benzomorphan.

On treatment with absolute ethanol, 2-cyclopropylmethyl-5,9-dimethyl-2'-[3-ethoxycarbonylpropoxy-(1)]-6,7-benzomorphan hydrochloride is obtained. The base liberated therefrom in the customary manner is identical with the product manufactured according to Example 1.

If the acid chloride is allowed to act on a solution of excess dimethylamine in absolute benzene, 2-cyclopropylmethyl-5,9-dimethyl-2'-[3-N,N-dimethylcarbamoylpropoxy-(1)]-6,7-benzomorphan of boiling point 220°–230°/0.01 mm Hg is obtained.

EXAMPLE 16

32.0 g of malonic acid diethyl ester are added to a solution of 4.6 g of sodium in 200 ccs of absolute ethanol. 39.8 g of 2-cyclopropylmethyl-5-ethyl-9-methyl-2'-[3-chloropropoxy-(1)]-6,7-benzomorphan hydrochloride (manufactured according to Example 8) are then introduced over the course of 15 minutes and the mixture is stirred for a further 15 hours under reflux. After cooling, it is diluted with 1 liter of water, rendered alkaline by adding dilute sodium hydroxide solution, and extracted with ether. The extract is washed with water, dried over sodium sulphate and evaporated.

The residue, consisting of 2-cyclopropylmethyl-5-ethyl-9-methyl-2'-[4-bisethoxycarbonylpropoxy-(1)]-6,7-benzomorphan, is dissolved in 500 ccs of dry ether and mixed with a solution of 2.53 g of sodium in 100 ccs of absolute ethanol and subsequently with 2.0 ccs of water. The whole is stirred overnight at room temperature and evaporated to dryness in vacuo, and the residue, consisting of the sodium salt of the malonic acid half-ester derivative, is taken up in absolute ethanol and rendered acid by passing in dry hydrogen chloride. After evaporating off the solvent, the residue is heated to 200°–210°C until the evolution of carbon dioxide has ceased, and is then cooled, taken up in water, and freed of insoluble constituents by extraction with ether. The base is precipitated by addition of sodium hydroxide solution and is then extracted with ether, and the solution is dried over sodium sulphate and evaporated. The 2-cyclopropylmethyl-5-ethyl-9-methyl-2'-[4-ethoxycarbonylbutoxy-(1)]-6,7-benzomorphan boils at 210° to 215° C/0.02 mm Hg.

The same compound is obtained if the bisethoxycarbonyl compound is completely saponified by heating with excess potassium hydroxide in ethanol and, after the decarboxylation, the resulting carboxylic acid is esterified in ethanol.

The same compound is obtained if instead of the malonic ester the equivalent amount of cyanoacetic acid ethyl ester is employed and, after the saponification and decarboxylation, the resulting 2-cyclopropylmethyl-5-ethyl-9-methyl-2'-[4-cyanobutoxy-(1)]-6,7-benzomorphan is converted into the ethyl ester analogously to Example 8 (last stage).

EXAMPLE 17

41.4 g of 2-cyclopropylcarbonyl-5-ethyl-9-methyl-2'-[3-ethoxycarbonylpropoxy-(1)]-6,7-benzomorphan (manufactured according to Example 5) are dissolved in 400 ccs of absolute tetrahydrofurane and added dropwise, at 30°C, to a suspension of 15.2 g of lithium alanate in 400 ccs of absolute tetrahydrofurane. The mixture is stirred for 1 hour at 30° to 35°C and 5 hours under reflux and is subsequently decomposed by careful addition of 30.5 ccs of 20% strength sodium hydroxide solution while cooling with ice, and the whole is stirred for a further 2 hours at room temperature and the product filtered off. The filter cake is boiled three times with 150 ccs of benzene at a time. The filtrates are together evaporated in vacuo. The crude 2-cyclopropylmethyl-5-ethyl-9-methyl-2'-[4-hydroxybutoxy-(1)]-6,7-benzomorphan is purified by distillation, b.p. 200° – 220° C/0.01 mm Hg. Yield 19.4 g.

The crude product can, without purification, be dissolved in 200 ccs of water and 15.3 g of concentrated sulphuric acid and is treated with 21 g of powdered potassium permanganate, added in portions, over the course of 2 hours at 10° to 15° C, with good stirring. The mixture is stirred for a further hour at 10° Cr, the manganese dioxide is filtered off, the filtrate is evaporated to dryness in vacuo and the residual water is removed by azeotropic distillation with benzene. The residue is esterified by adding a solution, manufactured at −10° C, of 30 ccs of thionyl chloride in 120 ccs of absolute ethanol. The mixture is stirred at −10° C until all has dissolved, and is stirred overnight at room temperature. Thereafter it is evaporated to dryness in vacuo and the residue is taken up in cold water. The solution is extracted once with ether, rendered alkaline with sodium hydroxide solution while cooling with ice, and immediately extracted with ether. The extract is dried over sodium sulphate, evaporated and distilled. The 2-cyclopropylmethyl-5-ethyl-9-methyl-2'-[3-ethoxycarbonylpropoxy-(1)]-6,7-benzomorphan agrees in all its properties with the product described in Example 8.

The following compounds are produced in a manner analogous to the preceding examples.

2-Cyclopropylmethyl-5,9-dimethyl-2'-isopropoxycarbonylmethoxy-6,7-benzomorphan, boiling point: 188°–192°/0.1 mm Hg.
2-Cyclopropylmethyl-5,9-dimethyl-2'-ethoxycarbonylmethoxy-6,7-benzomorphan, boiling point: 194°–198°/0.15 mm Hg.
2-Cyclopropylmetyl-5-ethyl-9-methyl-2'-ethoxycarbonylmethoxy-6,7-benzomorphan, melting point of the hydrochloride: 180°–182°.
2-Cyclopropylmethyl-5,9-dimethyl-2'-carboxymethoxy-6,7-benzomorphan, melting point of the sodium salt: 208°–211° (decomposition).
2-Cyclopropylmethyl-5,9-dimethyl-2'-(10-undecenyloxycarbonylmethoxy)-6,7-benzomorphan, melting point of the hydrochloride: 138°–142°.
2-Cyclopropylmethyl-5,9-dimethyl-2'-[1-carboxyethoxy-(1)]-6,7-benzomorphan, melting point of the sodium salt: 218°–223°.
2-Cyclopropylmethyl-5,9-dimethyl-2'-[1-ethoxycarbonylethoxy-(1)]-6,7-benzomorphan, boiling point: 170°–178°/0.09 mm Hg.
2-Cyclopropylmethyl-5-ethyl-9-methyl-2'-carboxymethoxy-6,7-benzomorphan, melting point of the sodium salt: 110° (decomposition).
2-Cyclopropylmethyl-5-ethyl-9-methyl-2'-[2-ethoxycarbonylpropoxy-(2)]6,7-benzomorphan, boiling point: 174°–184°/0.15 mm Hg.
2-Cyclopropylmethyl-5-ethyl-9-methyl-2'-[2-carboxypropoxy-(2)]-6,7-benzomorphan, melting point of the sodium salt: 75° (decomposition).
2-Cyclopropylmethyl-5-ethyl-9-methyl-2'-(3-methoxycarbonylprop-2-en-1-yloxy)-6,7-benzomorphan, boiling point: 202°–210°/0.15 mm Hg.
2-Cyclopropylmethyl-5-ethyl-9-methyl-2'-[10-ethoxycarbonyldecyloxy-(1)]-6,7-benzomorphan, melting point of the hydrochloride: 118°–121°.
2-Cyclopropylmethyl-5-ethyl-9-methyl-2'-α-ethoxycarbonylbenzyloxy-6,7-benzomorphan, boiling point: 225°–228°/0.1 mm Hg.
2-Cyclopropylmethyl-5,9-dimethyl-2'-(α-ethoxycarbonyl-p-chlorobenzyloxy)-6,7-benzomorphan, boiling point: 223°–226°/0.15 mm Hg.
2-Cyclopropylmethyl-5,9-dimethyl-2'-(α-ethoxycarbonyl-p-methylbenzyloxy)-6,7-benzomorphan, boiling point: 213°–218°/0.1 mm Hg.
2-Cyclopropylmethyl-5,9-dimethyl-2'-(α-ethoxycarbonyl-p-methoxybenzyloxy)-6,7-benzomorphan, boiling point: 220°–223°/0.15 mm Hg.
2-Cyclobutylmethyl-5,9-dimethyl-2'-[3-ethoxycarbonylpropoxy-(1)]-6,7-benzomorphan, boiling point: 232°–236°/0.9 mm Hg.
2-Cyclobutylmethyl-5,9-dimethyl-2'-[3-carboxyypropoxy-(1)]-6,7-benzomorphan, melting point of the sodium salt: 225° (decomposition).
2-Cyclobutylmethyl-5,9-dimethyl-2'-carboxymethoxy-6,7-benzomorphan, melting point of the sodium salt: 180° (decomposition) (monohydrate).
2-Cyclobutylmethyl-5,9-dimethyl-2'-ethoxycarbonylmethoxy-6,7-benzomorphan, boiling point: 210°–214°/0.09 mm Hg.

What is claimed is:

1. A compound of the formula:

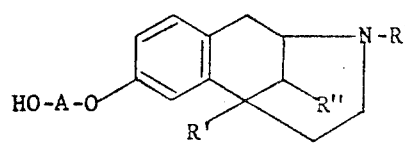

wherein
R is cyclopropylmethyl or cyclobutylmethyl;
R' and R'' are the same or different, and are straight or branched chain hydrocarbons of 1 to 5 carbon atoms; and
A is straight or branched chain alkylene or alkylidene of 1 to 10 carbon atoms or alkenylene of 2 to 10 carbon atoms, unsubstituted or substituted by phenyl or phenyl substituted by lower alkyl, lower alkoxy, halogen, nitro or carbonylamino;

or a pharmaceutically acceptable non-toxic salt thereof.

2. A compound of the formula:

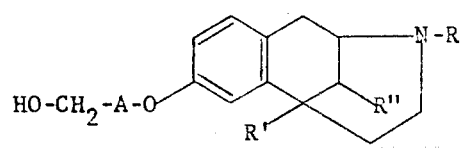

wherein
R is cyclopropylmethyl or cyclobutylmethyl;
R' and R" are the same or different, and are straight or branched chain hydrocarbons of 1 to 5 carbon atoms; and
A is straight or branched chain alkylene or alkylidene of 1 to 10 carbon atoms, or alkenylene of 2 to 10 carbon atoms, unsubstituted or substituted by phenyl or phenyl substituted by lower alkyl, lower alkoxy, halogen, nitro or carbonylamino;
or a pharmaceutically acceptable non-toxic salt thereof.

3. A comopound of the formula:

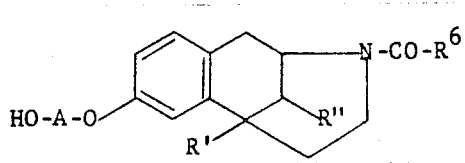

wherein
R' and R" are the same or different, and are straight or branched hydrocarbons of 1 to 5 carbon atoms;
$R^6$ is cyclopropyl or cyclobutyl; and
A is straight or branched chain alkylene or alkylidene of 1 to 10 carbon atoms or alkenylene of 2 to 10 carbon atoms, unsubstituted or substituted by phenyl or phenyl substituted by lower alkyl, lower alkoxy, halogen, nitro or carbonylamino;
or a pharmaceutically acceptable non-toxic salt thereof.

4. The compound of claim 1, which is

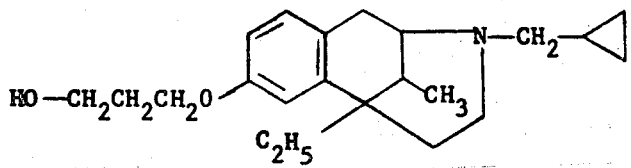

5. The compound of claim 1, which is

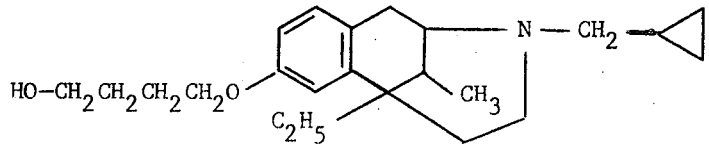

* * * * *